Aug. 11, 1925.　　　　　　　　　　　1,549,150
J. L. POPE
OIL SETTING TANK
Filed March 7, 1924
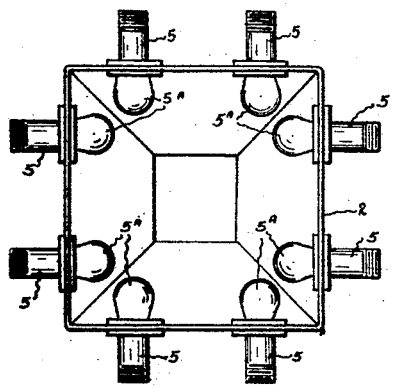
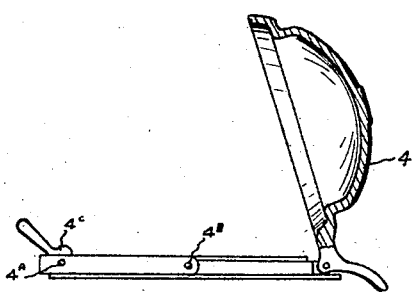
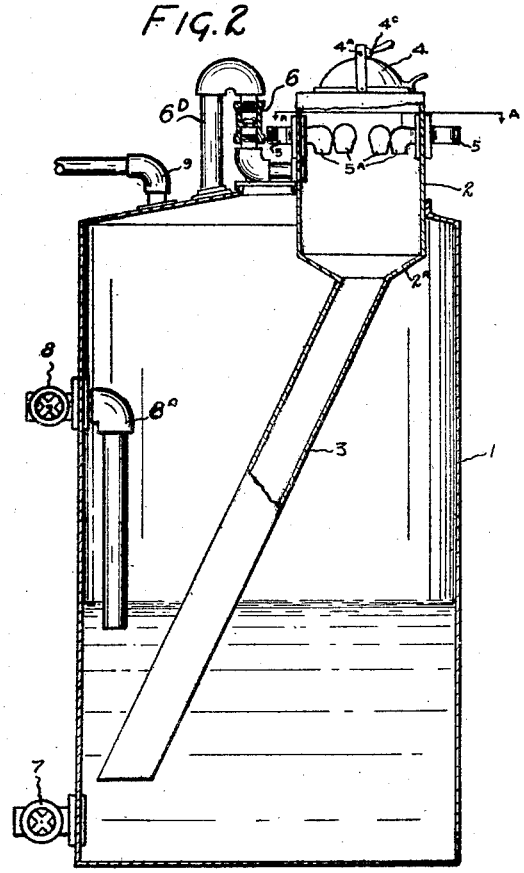
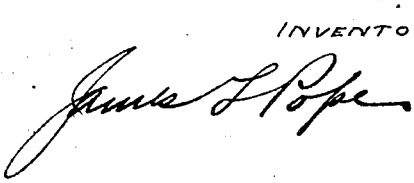
INVENTOR Patented Aug. 11, 1925.

1,549,150

UNITED STATES PATENT OFFICE.

JAMES L. POPE, OF WICHITA FALLS, TEXAS, ASSIGNOR TO M. & V. TANK CO., OF WICHITA FALLS, TEXAS.

OIL-SETTLING TANK.

Application filed March 7, 1924. Serial No. 697,567.

*To all whom it may concern:*

Be it known that I, JAMES L. POPE, a citizen of the United States, residing at Wichita Falls, in the county of Wichita and State of Texas, have invented new and useful Improvements in Oil-Settling Tanks; and I do declare the following to be a full, clear, and exact description of the invention, such as will enable others skilled in the art to which it appertains to make and use the same.

The invention relates to oil settling tanks and it is my principal object to provide a tank of this nature that will enable inspection of the flow chamber without releasing the gas pressure in the settling tank.

Further objects and advantages of the invention will be apparent as the invention is more fully disclosed.

With the foregoing in view, the invention resides in the novel subject matter hereinafter described and claimed, the description being supplemented by the accompanying drawing, wherein—

Figure 1 is a central longitudinal view partly sectioned.

Figure 2 is a view at line A—A of Figure 1.

Figure 3 is a partly sectioned view of the flow chamber cover.

Figure 4 is a sectional view of the check valve.

Referring now more particularly to the drawings, the numeral 1 indicates a tank having positioned in the top thereof a housing 2. The lower end of this housing projects within the tank and is provided with a funnel-shaped bottom 2ª.

3 is a square hollow member attached to the lower end of the housing 2 and extending therefrom in a downward oblique position, the lower end thereof being spaced from the bottom of the tank. 4 is an inspection hole cover disposed on top of the housing 2, the cover 4 being more clearly illustrated in Figure 3 of the drawing. 4ª is the cover clamping member pivoted at 4ᵇ. 4ᶜ is an eccentric cam pivoted in the clamping member 4ª for the purpose of closing the cover tightly. 5 is a plurality of pipes leading into the housing 2, having elbows 5ª attached thereto disposed downward on the inside of the housing 2. 6ᵈ is a tubular member disposed in a substantially U shape, one end thereof attached to the top of the tank 1, and the other end thereof attached to the housing 2. 6 is a check valve disposed vertically in the tubular member 6ᵈ near the housing connection. Figure 4 illustrates the type of check valve which has proved to be the most efficient for the purpose hereinafter described. 6ª is a centrally apertured divider. 6ᵇ is a cover pivoted as shown at 6ᶜ. 7 is a drain valve in the lower portion of the tank 1, for the purpose of draining the settlings from the bottom of said tank. 8 is a valve attached to the tank 1 above the valve 7. 8ª is a tubular member attached to the valve 8, extending downward inside of the tank 1, the lower end thereof terminating in the oil in the tank 1. 9 is a tubular member attached to the top of the tank 1, as shown.

The invention operates in the following manner: Oil coming into the housing 2 through the pipes 5 is lowered into the tank 1 through the square hollow member 3, thus eliminating agitation caused by the oil dropping to the bottom of the tank; the gas created in the square member 3 and the housing 2 passes into the tank 1, through the check valve 6 and the tubular member 6ᵈ; the gas in the tank 1 above the oil is piped therefrom through the tubular member 9 and used for commercial purposes. The lower end of the tubular member 8ª is disposed in the oil to prevent the gas in the tank 1 above the oil from passing therethrough. When it is desired to see the quantity of oil flowing into the housing 2 through each of the pipes 5, the cover 4 may be opened and the check valve 6 prevents the gas in the tank 1 from escaping therethrough.

It is believed from the foregoing description the nature and advantages of the invention will be readily apparent; however, I wish to indicate clearly that I do not limit myself to the specific construction herein shown and described and that such changes may be resorted to, when desired, as fall within the scope of what is herein claimed.

What I claim is:

An oil settling tank of the character described having a housing and means for releasing gas in said housing, said means comprising a tubular member connected to and extending from said housing to the top of said tank in a substantially U-shaped position and a check valve disposed vertically in said tubular member near the said housing connection, for the purpose set forth.

JAMES L. POPE.